(12) United States Patent
Wang

(10) Patent No.: US 8,428,668 B2
(45) Date of Patent: Apr. 23, 2013

(54) SLIDING MECHANISM

(75) Inventor: You Wang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 277 days.

(21) Appl. No.: 12/813,615

(22) Filed: Jun. 11, 2010

(65) Prior Publication Data

US 2011/0222799 A1 Sep. 15, 2011

(30) Foreign Application Priority Data

Mar. 12, 2010 (CN) .......................... 2010 2 0129304

(51) Int. Cl.
*H04M 1/00* (2006.01)
(52) U.S. Cl.
USPC .................. 455/575.4; 455/575.1; 455/575.8; 455/575.3

(58) Field of Classification Search ................ 455/575.4
See application file for complete search history.

(56) References Cited

U.S. PATENT DOCUMENTS

| | | | |
|---|---|---|---|
| 2005/0095995 A1* | 5/2005 | Bae | 455/90.3 |
| 2010/0091437 A1* | 4/2010 | Dong et al. | 361/679.01 |

* cited by examiner

*Primary Examiner* — Olumide T Ajibade Akonai
*Assistant Examiner* — Randy Peaches
(74) *Attorney, Agent, or Firm* — Altis Law Group, Inc.

(57) ABSTRACT

A sliding mechanism comprises a main plate, a sliding plate, a sliding enabling member and a biasing assembly. The sliding enabling member is coupled between the sliding plate and the main plate so the sliding plate slidably engages with the main plate. The biasing assembly is coupled between the sliding plate and the main plate. When the sliding plate is slid from a closed position to an intermediate position, the biasing assembly is distorted to exert a force on the sliding plate and the main plate, causing the sliding plate to automatically slide toward an open position once the sliding plate passes the intermediate position.

2 Claims, 6 Drawing Sheets

SLIDING MECHANISM

BACKGROUND

1. Technical Field

This disclosure relates to sliding mechanisms, particularly to sliding mechanisms used in an electronic device.

2. Description of Related Art

A typical slidable portable electronic device, such as a mobile phone, generally includes a cover with a display mounted thereon, a base with a keypad mounted thereon, and a sliding mechanism comprising a retaining plate and a sliding plate slidably mounted to the retaining plate. The cover is mounted to the sliding plate and the base is mounted to the retaining plate, so that the cover can slide relative to the base when the sliding plate moves relative to the retaining plate. However in the conventional product configurations, the sliding mechanisms can be complicated and provide size inefficiencies as they tend to take up a lot of space.

Therefore, there is a room for improved in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary sliding mechanism for electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
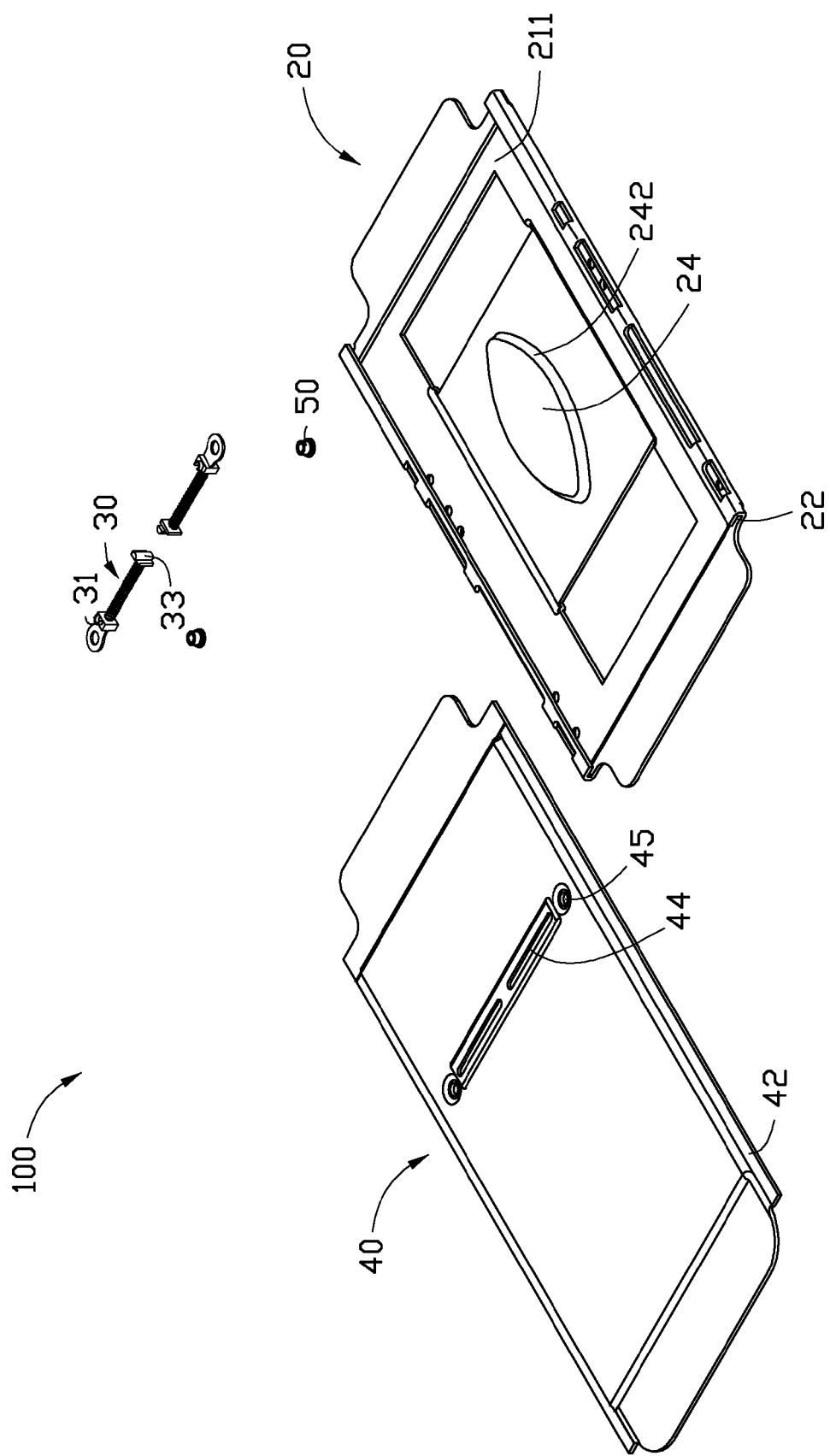
FIG. 1 is an exploded view of an exemplary embodiment of a sliding mechanism.
Figure 2:
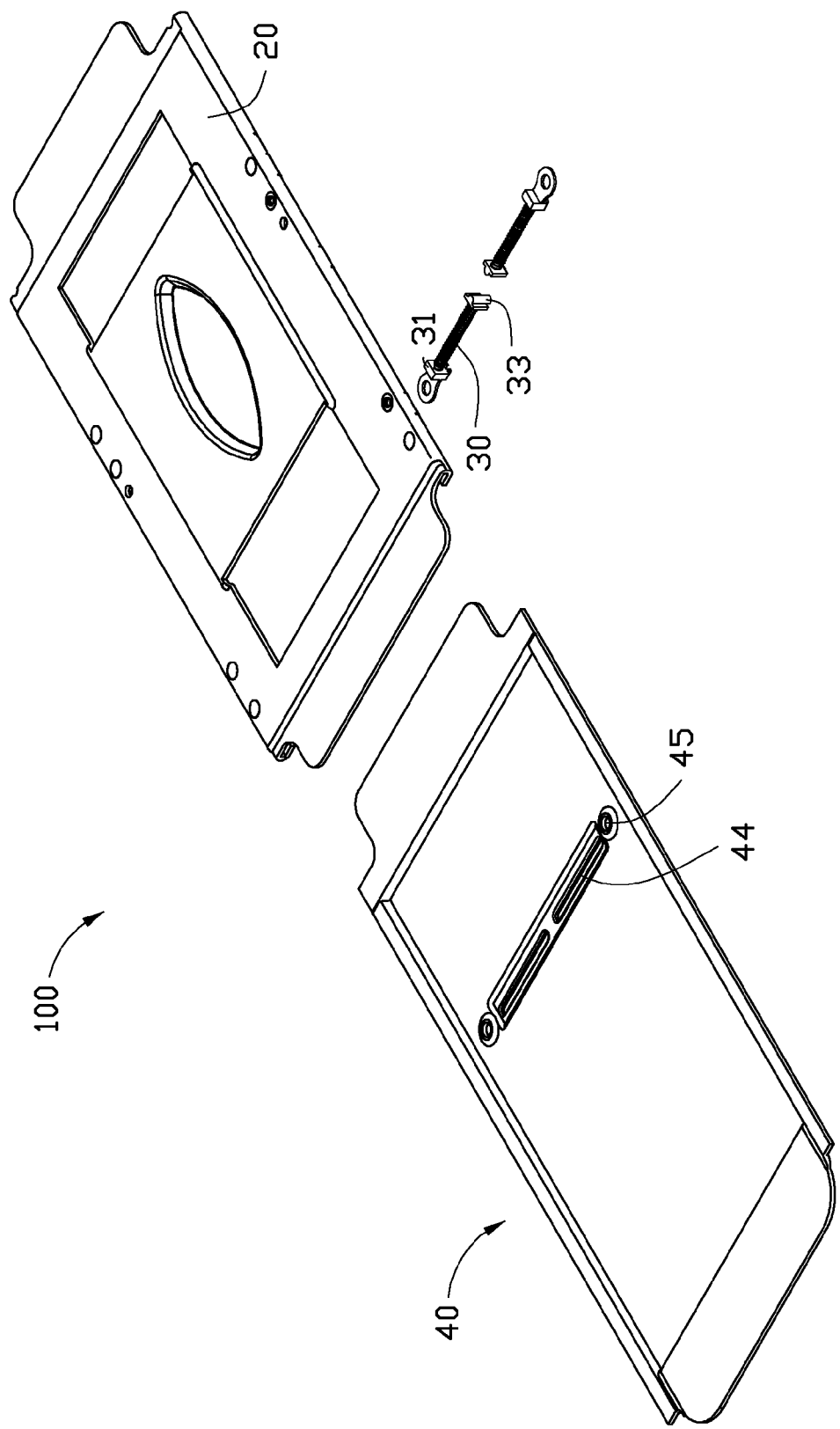
FIG. 2 is another exploded view of the sliding mechanism shown in FIG. 2.
Figure 6:
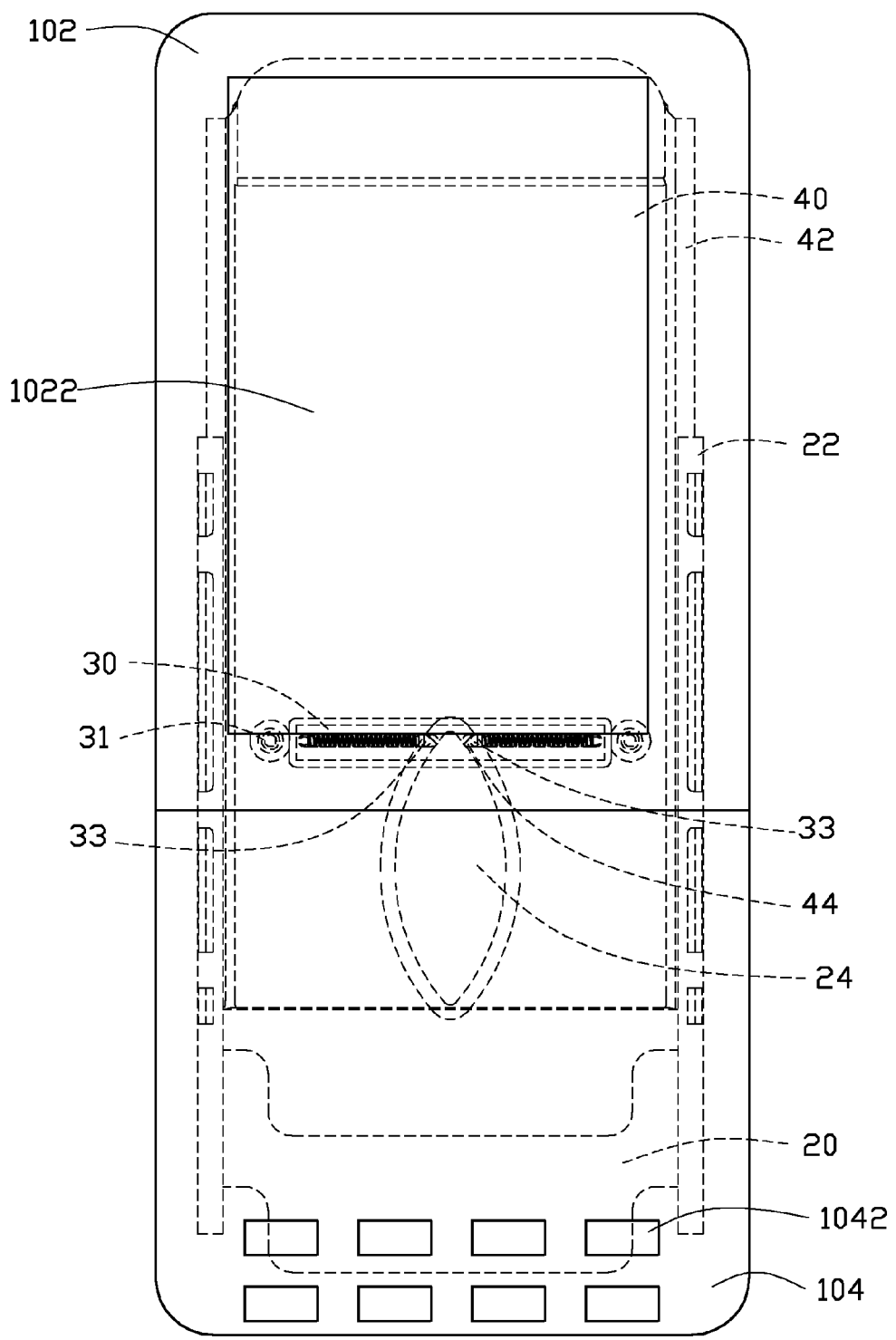
FIG. 6 is an isometric view of the portable electronic device incorporating the sliding mechanism shown in FIG. 5.

An exemplary embodiment of a sliding mechanism 100 is shown in FIGS. 1 and 2. FIG. 1 illustrates an exploded view of the sliding mechanism 100. FIG. 2 illustrates another exploded view of the sliding mechanism 100 from an aspect opposite to FIG. 1. Referring to FIG. 6, the sliding mechanism 100 may be used in a portable device like a mobile phone. The mobile phone includes a slidable housing 102 with a display 1022 and a main housing 104 with a keypad 1042, which are connected by the sliding mechanism 100.

The sliding mechanism 100 includes a sliding plate 40 and a main plate 20 which are slidably coupled by a sliding enabling member (not labeled). The sliding enabling member is coupled between the sliding plate 40 and the main plate 20 so the sliding plate 40 is slidably engages with the main plate 20. The sliding enabling member, in this exemplary embodiment, comprises a set of rails 42 and a set of tracks 22 that engage the rails 42. The rails 42 longitudinally protrude from opposite edges of the sliding plate 40 and the tracks 22 are longitudinally defined in opposite edges of the main plate 20.

Figure 3:
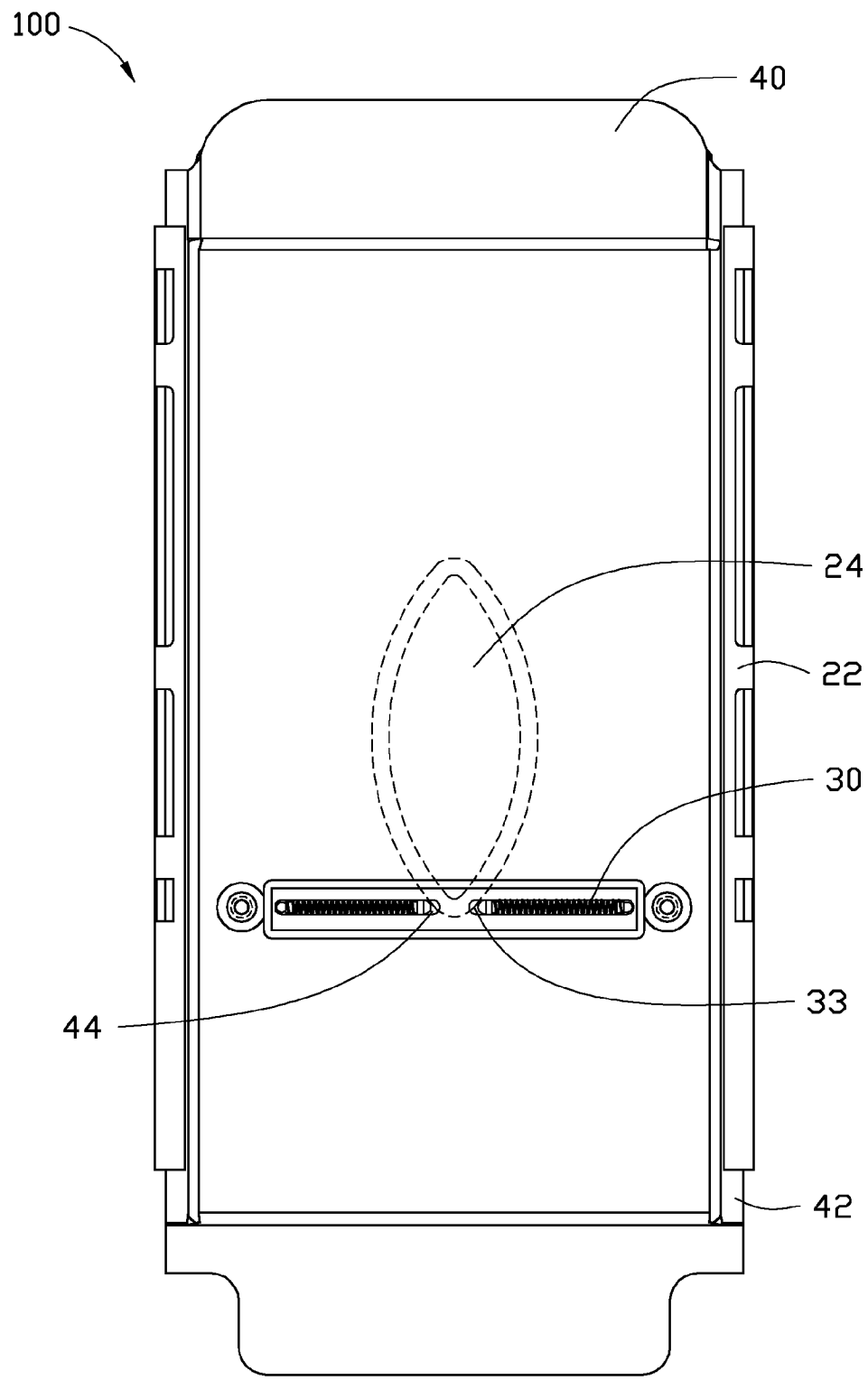
FIG. 3 is an assembled and partially perspective view of the sliding mechanism in a closed position.
Figure 5:
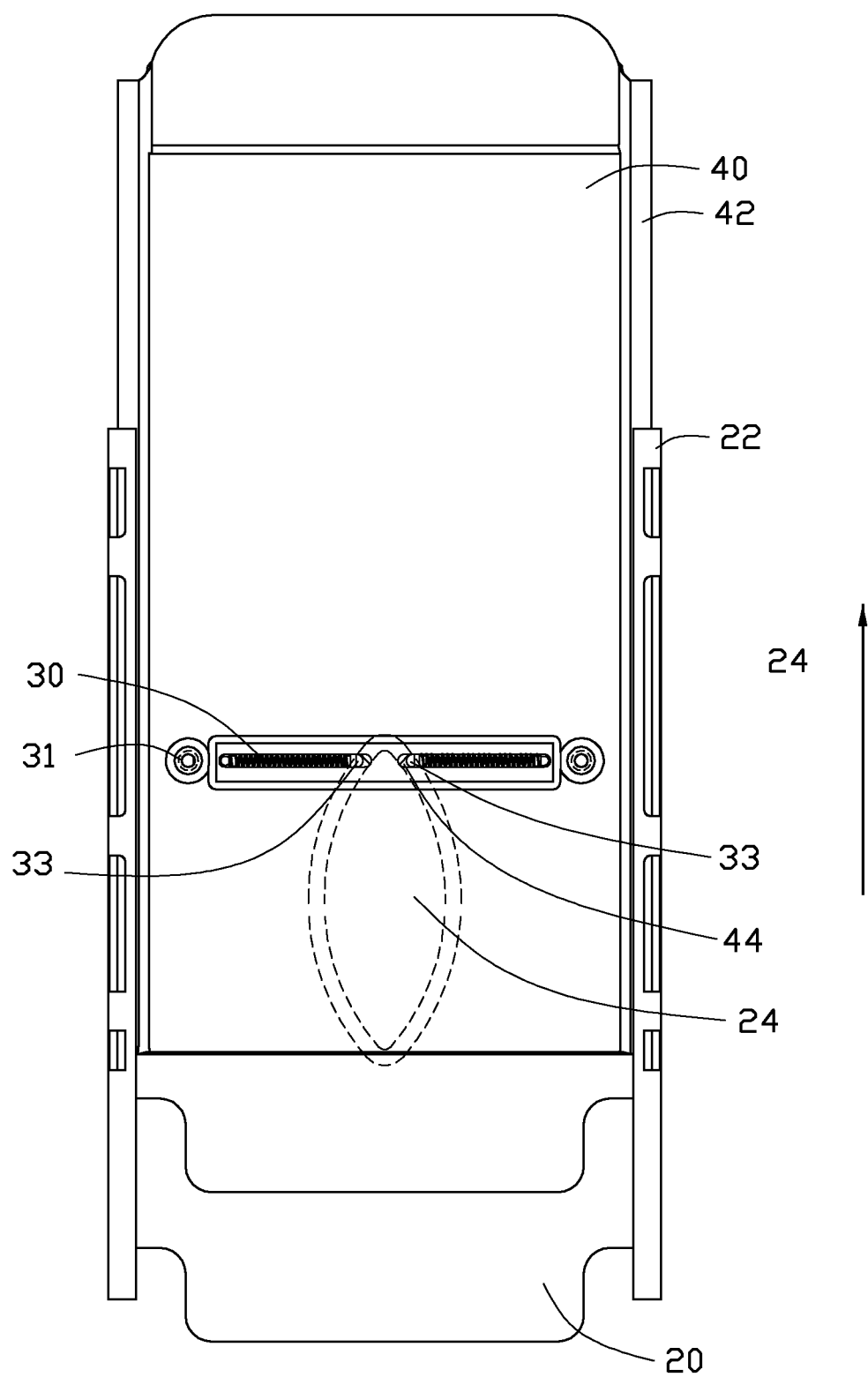
FIG. 5 is an assembled and partially perspective view of the sliding mechanism in an open position.

The sliding plate 40 slides along the rails 42 between a closed position shown in FIG. 3 and an open position shown in FIG. 5. It is understood that the rails 42 may be positioned on either the sliding plate 40 or the main plate 20 and the rail engaging members (e.g. tracks 22) may be positioned on the element opposite the rails 42.

Figure 4:
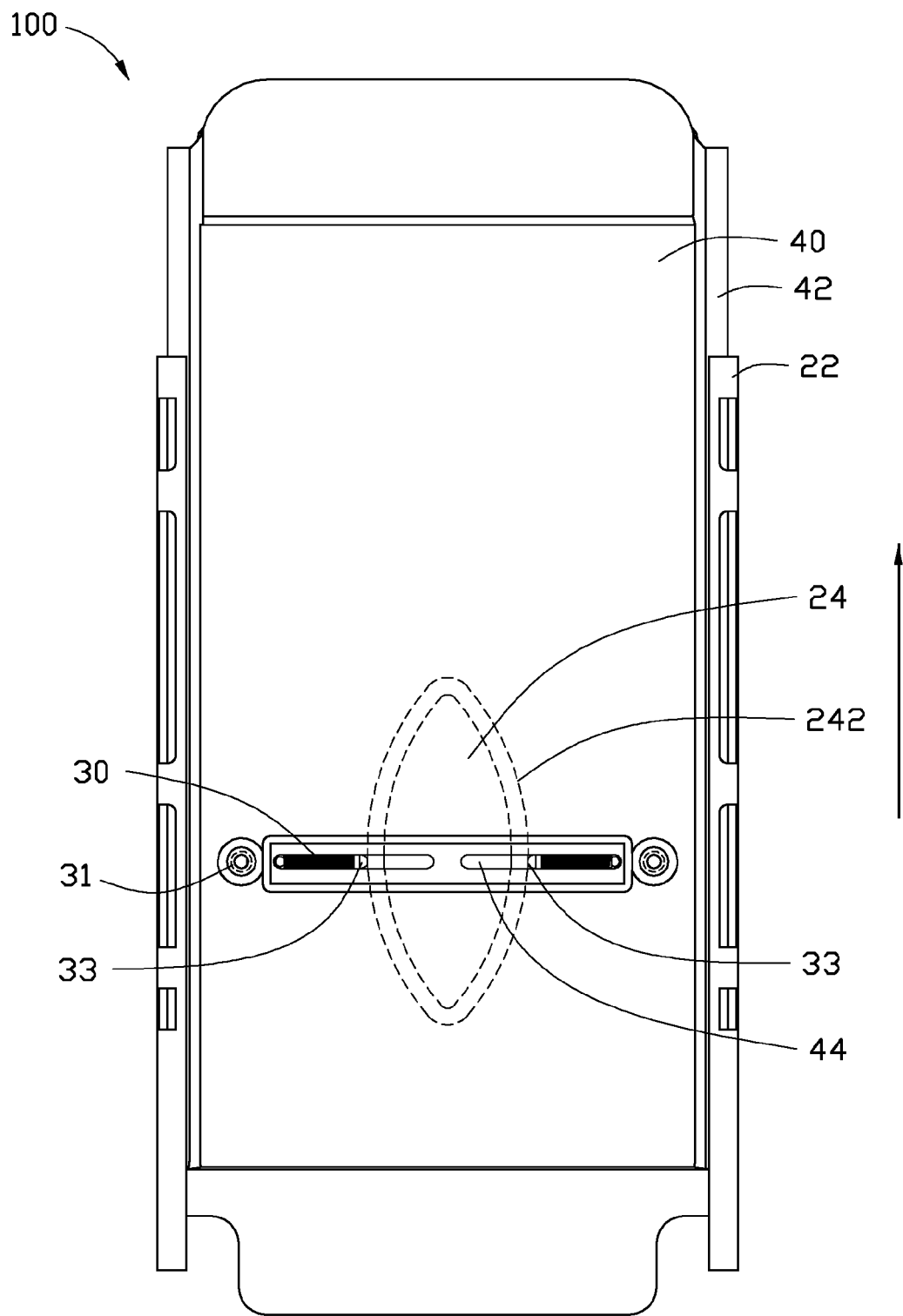
FIG. 4 is an assembled and partially perspective view of the sliding mechanism in an intermediate position.

Referring to FIGS. 3-5, a biasing assembly (not labeled) is coupled between the sliding plate 40 and the main plate 20. When the sliding plate 40 is slid from the closed position shown in FIG. 3 to an intermediate position shown in FIG. 4, the biasing assembly is distorted to exert a force on the sliding plate 40 and the main plate 20, causing the sliding plate 40 to automatically slide along the rails 42 toward the open position shown in FIG. 5 once the sliding plate 40 passes the intermediate position shown in FIG. 4.

The biasing assembly, in this exemplary embodiment, may include a guiding member 24 and two biasing members 30 that engage the guiding member 24. The guiding member 24 is positioned on the main plate 20 and includes two opposite arcuate surfaces 242 each of which respectively resist against one of the biasing members 30. In this exemplary embodiment, the guiding member 24 may be an elliptical block protruding from the main plate 20 in the direction of the sliding plate 40.

The biasing members 30 are coupled between the sliding plate 40 and the guiding member 24. Each biasing member 30 may be an elastic resisting member (such as an expansion spring, a compression spring, or an elastic band). In this exemplary embodiment, each biasing member 30 is an expansion spring including a retaining portion 31 formed on one end thereof and a resisting portion 33 formed on another end thereof. Each retaining portion 31 is respectively mounted in one of the two retaining holes 45 by a rivet 50. The resisting portions 33 slidably resist against the arcuate surfaces 242 of the guiding member 24, respectively. When the sliding plate 40 is slid from the closed position shown in FIG. 3 to an intermediate position shown in FIG. 4, the resisting portions 33 slide toward the retaining portions 31 of the biasing members 30 so the biasing members 30 are compressed to exert a force on the sliding plate 40 and the main plate 20, causing the sliding plate 40 to automatically slide along the rails 42 toward the open position shown in FIG. 5 once the sliding plate 40 passes the intermediate position shown in FIG. 4.

The biasing assembly also acts as a stopping member that applies a constant bias force to make the sliding mechanism 100 steadily positioned in the closed position shown in FIG. 3 and the open position shown in FIG. 5.

The sliding mechanism 100 further includes two guiding grooves 44 to respectively guide the resisting portions 33 of the biasing members 30 to slide relative to the sliding plate 40. Each guiding groove 44 is defined between each retaining portion 31 and its corresponding resisting portion 33. When the resisting portions 33 slide toward their corresponding retaining portions 31, the resisting portions 33 are slid in corresponding guiding grooves 44 so the resisting portions 33 can be slid steadily relative to the sliding plate 40 to compress the biasing members 30.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A sliding mechanism, comprising:
a main plate;
a sliding plate defining two guiding grooves arranged along a first line;
a sliding enabling member coupled between the sliding plate and the main plate so the sliding plate slidably engages with the main plate; and
a biasing assembly coupled between the sliding plate and the main plate, the biasing assembly including a guiding member and two biasing members slidably resisting the guiding member, each of the two biasing members received and sliding in each of the two guiding grooves, wherein when the sliding plate is slid from a closed position to an intermediate position along a direction of a second line perpendicular to the first line, the biasing members are distorted along the guiding grooves by the guiding member to exert a force on the sliding plate and the main plate causing the sliding plate to automatically slide toward an open position once the sliding plate passes the intermediate position;
wherein the guiding member protrudes from the main plate and includes two opposite surfaces which each have a peak that resists against a corresponding biasing member, each biasing member includes a retaining portion formed on one end thereof and a resisting portion formed on another end thereof; the retaining portions are respectively mounted to the sliding plate, each of the resisting portions slidably resisting against one of the arcuate surfaces of the guiding member; and
wherein the sliding plate further defines two retaining holes, each of the two retaining portions is respectively mounted in one of the two retaining holes by a rivet.

2. An electronic device, comprising:
a main housing;
a slidable housing;
a sliding mechanism slidablely connected between the main housing and the slidable housing;
a main plate connected to the main housing;
a sliding plate connected to the slidable housing, and defining two guiding grooves arranged along a first line;
a sliding enabling member coupled between the sliding plate and the main plate so the sliding plate slidably engages with the main plate; and
a biasing assembly including a guiding member and two biasing members that engaging the guiding member, each of the two biasing members received and sliding in each of the two guiding grooves;
wherein when the sliding plate slides relative to the main plate along a direction of a second line perpendicular to the first line, the biasing members slide along the guiding member and are compressed along the guiding grooves by the guiding member to exert a force on the sliding plate and the main plate, causing the sliding plate to automatically slide relative to the sliding plate; each biasing member includes a retaining portion formed on one end thereof and a resisting portion formed on another end thereof; the guiding member includes two opposite arcuate surface; the retaining portions are respectively mounted to the sliding plate, the resisting portions slidably resist the arcuate surfaces of the guiding member;
and wherein the sliding plate further defines two retaining holes, each of the two retaining portions is respectively mounted in one of the two retaining holes by a rivet.

* * * * *